(12) United States Patent
Feiling et al.

(10) Patent No.: US 12,320,746 B2
(45) Date of Patent: Jun. 3, 2025

(54) METHOD FOR INVESTIGATING AN ELECTROLYTE SOLUTION FOR PROCESSING A COMPONENT MATERIAL OF AN AIRCRAFT ENGINE

(71) Applicant: MTU Aero Engines AG, Munich (DE)

(72) Inventors: Nicole Feiling, Munich (DE); Johann Auerweck, Markt Schwaben (DE)

(73) Assignee: MTU Aero Engines AG, Munich (DE)

( * ) Notice: Subject to any disclaimer, the term of this patent is extended or adjusted under 35 U.S.C. 154(b) by 315 days.

(21) Appl. No.: 17/826,096

(22) Filed: May 26, 2022

(65) Prior Publication Data

US 2022/0381682 A1 Dec. 1, 2022

(30) Foreign Application Priority Data

May 31, 2021 (DE) ...................... 10 2021 114 039.0

(51) Int. Cl.
| | | |
|---|---|---|
| *G01N 21/359* | (2014.01) | |
| *C25F 1/04* | (2006.01) | |
| *C25F 3/02* | (2006.01) | |
| *G01N 21/3577* | (2014.01) | |

(52) U.S. Cl.
CPC ....... *G01N 21/359* (2013.01); *G01N 21/3577* (2013.01); *C25F 1/04* (2013.01); *C25F 3/02* (2013.01)

(58) Field of Classification Search
CPC ............. G01N 21/359; G01N 21/3577; G01N 2021/3595; C25F 1/04; C25F 3/02
See application file for complete search history.

(56) References Cited

U.S. PATENT DOCUMENTS

| | | | |
|---|---|---|---|
| 5,453,841 A | 9/1995 | Reipa et al. | |
| 7,270,733 B2* | 9/2007 | Wikiel | G01N 27/42 |
| | | | 205/82 |
| 7,427,344 B2* | 9/2008 | Han | C25D 3/38 |
| | | | 205/101 |
| 2003/0127341 A1* | 7/2003 | King | G01N 21/359 |
| | | | 205/789.5 |
| 2005/0028932 A1 | 2/2005 | Shekel et al. | |
| 2018/0001406 A1* | 1/2018 | Trimmer | B23H 3/04 |
| 2019/0173122 A1* | 6/2019 | Ellis | G01N 21/552 |
| 2020/0240970 A1* | 7/2020 | Wu | G01N 27/025 |

FOREIGN PATENT DOCUMENTS

| | | |
|---|---|---|
| CN | 111830025 A | 10/2020 |
| DE | 102016113059 A1 | 2/2017 |
| DE | 102018201668 A1 | 8/2019 |

(Continued)

OTHER PUBLICATIONS

Lucy Wei, Copper electroplating fundamentals, Ideas and Innovation blog, Nov. 22, 2016 (Year: 2016).*

(Continued)

*Primary Examiner* — Kara E. Geisel
*Assistant Examiner* — Jonathon Cook
(74) *Attorney, Agent, or Firm* — Hinckley Allen & Snyder, LLP; David Josephs

(57) ABSTRACT

A method for investigating an electrolyte solution for processing a component, particularly a component or a component material of an aircraft engine, by near infrared spectroscopy.

11 Claims, 1 Drawing Sheet

(56) References Cited

FOREIGN PATENT DOCUMENTS

| GB | 2217838 A | * 11/1989 | ......... G01N 21/3577 |
| WO | 2003 057 947 A1 | 7/2003 | |

OTHER PUBLICATIONS

Jerry Workman, "A Review of Process near Infrared Spectroscopy: 1980-1994," J. Near Infrared Spectrosc. 1, 221-245 (1993) (Year: 1993).*

1. Olinga A, Siesler HW. Quality Control and Process Monitoring by Vibrational Spectroscopy. NIR news. 2000; 11(3):9-13. doi: 10.1255/nirn.567 (Year: 2000).*

Yang et al "Chapter Seven—Alarm management techniques to improve process safety," Methods in Chemical Process Safety, Elsevier, vol. 6, 2022, pp. 227-280, ISSN 2468-6514, ISBN 9780323988971, https://doi.org/10.1016/bs.mcps.2022.04.009. (Year: 2022).*

Madhav Datta and Lubomyr T. Romankiw Application of Chemical and Electrochemical Micromachining in the Electronics Industry 1989 J. Electrochem. Soc. 136 285C DOI 10.1149/1.2097055 (Year: 1989).*

Freeman, J, et al: "A fiber-optic absorption cell for remote determination of copper in industrial electroplating baths", Analytica Chimica Acta, Bd. 177 (Aug. 5, 1985), pp. 121-128.

Zimmer, Martin et al: "NIR-spectroscopical process control for wet chemical processes", 24th European Solar Energy Conference and Exhibition, Sep. 21-25, 2009 (Sep. 1, 2009).

Davydov, A. D. et al: "Electrochemical machining of titanium. Review", Russian Journal of Electrochemistry, Maik Nauka/Interperiodica Publishing, Moscow, RU, Bd. 53, Nr. 9, Sep. 23, 2017 (Sep. 23, 2017), pp. 941-965.

* cited by examiner

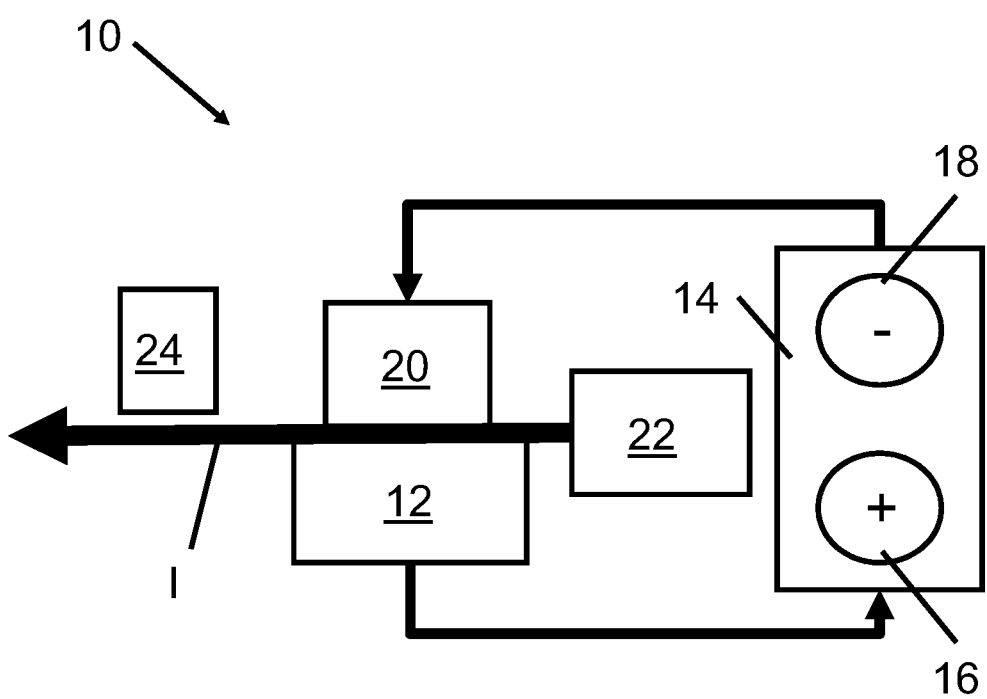

METHOD FOR INVESTIGATING AN ELECTROLYTE SOLUTION FOR PROCESSING A COMPONENT MATERIAL OF AN AIRCRAFT ENGINE

BACKGROUND OF THE INVENTION

The invention relates to a method for investigating an electrolyte solution for processing a component material of an aircraft engine.

Electrolyte solutions contain dissociated ions that move in a directed manner under the influence of an electrical field, and are required for numerous processes for processing component materials for aircraft engines. These component materials may involve materials or semi-finished products that are used for manufacturing specific aircraft engine components, or may involve the materials of already finished components that are cleaned with the use of an electrolyte solution, reprocessed or repaired and/or will be overhauled. These component materials or components may involve, for example, blisks made of Ni-based or Ti-based alloys, low-pressure turbine disks, and, in general, all components or component materials that are to be etched, coated or cleaned. For example, in the case of electrochemical metal machining ((high-precision) electrochemical machining (P)ECM), alloy components of the workpiece are dissolved by electrolysis and go into solution as electrolyte. Depending on the material group each time, an anodic metal dissolution takes place in aqueous electrolyte solutions suitable therefor. The metal cations (e.g., $Ni^{2+}$, $Fe^{2+}$, $Fe^{3+}$, $Cr^{6+}$, etc.) that are formed either accumulate continuously in the electrolyte or are directly precipitated as metal hydroxide and removed, e.g., by filtration from the system. For example, for the processing of nickel-based alloys, normally a sodium nitrate solution with defined concentration is used.

Electrolyte solutions are used analogously for pretreating components for subsequent CBN coating, for example, for manufacturing blade-tip cladding, and contain mixtures of ammonium bifluoride and nitric acid. In addition, aqueous electrolyte solutions of acetic acid and hydrofluoric acid are used for pretreating Ti-containing or Ti-based component materials. Further fields of application of electrolyte solutions in the processing of component materials for aircraft engines comprise cleaning said components or component materials, as well as standard electroplating processes such as nickel-plating, chrome-plating, and so forth.

In order to assure a consistent electrolyte quality and thus a high quality of processing the component material and/or the component, electrolyte solutions must be monitored. Currently, for this purpose in serial manufacture, the parameters of temperature, pH, and conductance are monitored, and controlled or regulated correspondingly.

In addition, the electrolyte composition is of great importance for a stable processing. For determining the composition, which is varied depending on the particular electrolyte solution, currently a sample is collected manually and analyzed "wet chemically" or by ion chromatography in the laboratory.

In prior investigative methods, a circumstance that is viewed as problematical is that manual investigations are laborious and lengthy, so that a continuous monitoring is not possible, and there are available no relevant measurement values for characterizing the electrolyte solution. Therefore, a targeted control or regulation of the corresponding processing of the component or of the processing of the component material is also not possible. Instead of this, the long reaction times between measurement and measurement result frequently already lead to intermediate deviations and process fluctuations, which introduce corresponding losses in quality. If such quality losses are determined, on the other hand, there is frequently no reliable information on the electrolyte solution used for the manufacturing process.

SUMMARY OF THE INVENTION

The object of the present invention is to create an improved possibility for investigation of electrolyte solutions for processing component materials for aircraft engines.

The object is achieved according to the invention by a method with the features of the present invention. Advantageous embodiments with appropriate enhancements of the invention are set forth in detail below.

A first aspect of the invention relates to a method for investigating an electrolyte solution for processing a component, in particular, a component or a component material of an aircraft engine, wherein the investigation according to the invention is conducted by near infrared spectroscopy. Near infrared spectroscopy (NIRS) is an investigative method in which, by a near infrared spectrometer, the interaction between light in the near infrared region (NIR, 780 to 2500 nm or about 13,000-4,000 $cm^{-1}$) of the electromagnetic spectrum and the ingredients of the electrolyte solution is investigated. For example, for this purpose, the electrolyte solution is transported to or poured in a suitable manner into a measurement chamber of the near infrared spectrometer. The near infrared spectrometer in this case can be basically integrated into a system in which the electrolyte solution under investigation will be used. This interaction between light and the ingredients induces overtone and combination band molecular vibrations that can be detected with the NIRS. Based on the higher energy of the near infrared light in comparison to the middle infrared as well as the smaller absorption coefficients, there results a comparatively large penetration depth into the electrolyte solution, so that layer thicknesses in the millimeter range can be investigated. In addition, the electrolyte solution can be directly or natively investigated with the NIRS, so that an upstream sampling, extraction, or the like is not necessary. In the case of transmission or absorbance measurements in a reactor filled with the electrolyte solution, in a line conducting the electrolyte solution, in an electrolyte solution tank, or the like, NIRS is also less sensitive to contamination. In addition, real time measurements of the electrolyte solution are possible with NIRS, so that a direct integration of the investigation results, for example, into the control station is possible. The previous manual steps for sampling and investigating the sample can be completely omitted, whereby the investigation can be carried out particularly rapidly, simply, and in a cost-effective manner. NIRS is also conducted as a physical investigation method without using chemicals and offers the further advantage of a particularly short measurement time of about 1 minute or less. NIRS can also analyze several parameters within one investigation (scan). This shortens the time for obtaining the result of the investigation, since multifactor analysis can be covered by only a single NIR measurement. NIRS can also be applied very simply, so that it can be carried out by non-professionals. NIRS is also nondestructive and thus does not alter the electrolyte solution during the analysis. In general, "a/an" is to be read as the indefinite article in the scope of this disclosure, and thus unless there is an express indication to the contrary, is also always read as "at least one". Conversely, "a/an" can also be understood as "only one".

In an advantageous embodiment of the invention, it is provided that the electrolyte solution is investigated continuously and/or at predetermined time intervals by near infrared spectroscopy, and/or that at least one ingredient of the electrolyte solution is determined qualitatively and/or quantitatively by near infrared spectroscopy. By a continuous and/or periodic investigation of the electrolyte solution, it can be assured that any possible problems are recognized early and can be eliminated in a timely manner before these lead to process disruptions and quality losses of the processed component or component material. A qualitative and/or quantitative determination is possible, in particular, for ingredients that have asymmetric bonds (—NH, —OH, —SH, —CH, etc.) as well as for ingredients with an inducible dipole moment. The detected molecular vibrations in this case are usually not directly interpreted, but are analyzed with the aid of statistical methods.

In an advantageous embodiment of the invention, it is provided that at least one quality parameter of the electrolyte solution is determined based on a result of the near infrared spectroscopic investigation. It is thereby possible to objectify the quality of the electrolyte solution and optionally examine it continuously or periodically.

In an advantageous embodiment of the invention, it is provided that, based on the result of the near infrared spectroscopic investigation, it can be examined whether the electrolyte solution fulfills a predefined quality criterion. This makes it possible to define a minimum quality and minimum composition of the electrolyte solution that must be fulfilled in order to be able to assure a reliable procedure for processing the component or the component material.

Preferably, it is provided that the electrolyte solution is used for processing the component material if it fulfills the predefined quality criterion, and/or in which the electrolyte solution will not be used for processing the component material if it does not fulfill the predefined quality criterion. In this way, it is assured that the component or the component material is only then processed with the use of the electrolyte solution if it has the corresponding minimum quality and minimum composition. Whenever the quality criterion is not fulfilled, for example, the processing cannot begin, or will be interrupted or aborted, each time depending on the processing method and the method step.

In an advantageous embodiment of the invention, it is provided that the electrolyte solution will be modified, in particular purified and/or adjusted, if it does not fulfill the predefined quality criterion. A control or regulation of the composition of the electrolyte solution is possible thereby, so that an electrolyte solution that is as consistent as possible can be assured. For example, when an inadmissible depletion of a specific ingredient is recognized, this ingredient can be supplied to the electrolyte solution in an appropriate amount or it can be produced in the electrolyte solution, in order to again fulfill the quality criterion. Conversely, the electrolyte solution can be diluted when an inadmissible accumulation of a specific ingredient is recognized. Alternatively or additionally, the ingredient in question can be depleted up to the admissible concentration, for example, it can be precipitated out.

In a further advantageous embodiment of the invention, it is provided that a warning signal is generated by a human-machine interface if the electrolyte solution does not fulfill the predefined quality criterion. The warning signal can be, for example, haptic, acoustic, or optical, in order to indicate, for example, to a supervisor, the problem of an inadmissible electrolyte solution composition. The human-machine interface for this purpose can be coupled to the near infrared spectrometer in suitable form for data exchange, for example, by a cable or wirelessly, and a corresponding signal will be received for generating the warning signal if the quality criterion is not fulfilled.

In an advantageous embodiment of the invention, it is provided that the electrolyte solution will be modified until it fulfills the predefined quality criterion, whereby the modification is controlled and/or regulated based on at least one additional near infrared spectroscopic investigation of the electrolyte solution. In other words, near infrared spectroscopy is also used advantageously for control when restoring the desired electrolyte solution composition, so that an additional expenditure for apparatus and analysis is not necessary.

Preferably, it is provided that, by near infrared spectroscopy, one or more ingredients from the group composed of water, nitrate, sulfate, fluoride, chloride, and acetic acid in the electrolyte solution will be qualitatively and/or quantitatively determined. A sufficiently reliable and information-rich investigation of the electrolyte solutions used in connection therewith can be achieved thereby for most processing methods used for components or component materials of aircraft engines.

In a further advantageous embodiment of the invention, it is provided that the electrolyte solution is used for electrochemical metal machining ((P)ECM) of the component material and/or for pretreatment of the component material for CBN coating and/or for pretreatment of Ti-containing component materials and/or for cleaning the component material and/or for an electroplating coating method, in particular for nickel plating, and/or in which the electrolyte solution is used for processing a component from the group composed of blisk, bling, and low-pressure turbine disk. In this way, the method can be advantageously used for the most important components and component materials of aircraft engines.

In an advantageous embodiment of the invention, it is provided that the near infrared spectroscopic investigation is carried out by a Fourier transform based (FT-NIR) spectrometer and/or a dispersive spectrometer. Compared to dispersively operating NIR spectrometers, an FTIR spectrometer is characterized by shorter measurement times and an improved signal to noise ratio, whereby it is suitable for the measurement of lower concentrations. The advantages of dispersive NIR spectrometers consists in the fact that they can use both visible (vis) as well as near infrared light (NIR) for the analysis of samples, which increases the possible application possibilities.

BRIEF DESCRIPTION OF THE DRAWING FIGURE

Additional features of the invention result from the claims, the figures, and the description of the figures. The features and combinations of features named above in the description, as well as the features and combinations of features named in the description of the figures and/or shown in the figures alone can be used not only in the combination indicated in each case, but also in other combinations, without departing from the scope of the invention. Thus, embodiments that are not explicitly shown and explained in the figures, but proceed and can be produced by separate combinations of features from the explained embodiments, are also to be viewed as comprised and disclosed by the invention. Embodiments and combinations of features that thus do not have all features of an originally formulated independent claim are also to be viewed as disclosed. Moreover, embodiments and combinations of features that depart from the combinations of features presented in references back to the claims, or deviate from these, are to be viewed as disclosed, particularly by the embodiments presented above.

FIG. 1 shows a schematic illustration of a device for precise electrochemical machining.

DESCRIPTION OF THE INVENTION

FIG. 1 shows a schematic illustration of a device 10 for the electrochemical metal machining of a component material 12 for an aircraft engine (not shown). The ECM involves a contact-free processing method without input of heat. The device 10 comprises a DC voltage source 14 with an anode 16 (+) and a cathode 18 (−). The cathode 18 is galvanically coupled to a tool 20, whereas the anode 16 is galvanically coupled to the present electrically conductive component material 12. An aqueous electrolyte solution 22 is guided between the tool 20 and the component material 12 according to arrow I, by which an exchange of charge takes place between the cathode 18 and the anode 16, by which an anodic dissolution of the component material 12 is produced. In this way, different geometric features such as, for example, channels, grooves, contours, and the like can be manufactured in the component material 12, with high precision and without contact. The substance of the component material 12 that is machined in this way precipitates from the electrolyte solution 22 as metal hydroxide. The processing takes place independently of the microstructure of the component material 12, so that both soft as well as hard metals and intermetallic component materials 12 can be processed. This means that not only practically all metals, but also highly alloyed materials such as nickel-based alloys, titanium alloys, or hardened materials can be processed.

Relative to the direction of flow of the electrolyte solution 22, which is characterized by arrow I, a near infrared spectrometer 24 is arranged downstream of the component material 12, by which the electrolyte solution 22 is investigated by near infrared spectroscopy. Basically, the near infrared spectrometer 24 can also be arranged upstream of the component material 12. Alternatively, two or more near infrared spectrometers 24 can be arranged upstream and downstream of the component material 12. Likewise, it may be provided that upstream and/or downstream samples of the electrolyte solution 22 can be supplied to an individual near infrared spectrometer 24 via corresponding supply lines (not shown) for the investigation. The device 10 represents a stand-alone aspect of the invention.

The electrolyte solution 22 is investigated continuously and/or at predetermined time intervals by near infrared spectroscopy, wherein preferably at least one ingredient of the electrolyte solution 22 is qualitatively and/or quantitatively determined by near infrared spectroscopy. The ingredient(s) investigated in each case depend on the composition of the electrolyte solution 22. For example, in the case of (P)ECM, in which sodium nitrate-containing electrolyte solutions 22 are frequently used, the ingredients nitrate/sulfate will be determined. In other methods, such as, e.g., the pretreatment for CBN coatings for blade-tip cladding, the electrolyte solutions 22 frequently contain ammonium bifluoride/nitric acid. In this case, for example, the content of free fluoride ions in the electrolyte solution 22 can be investigated. In the pretreatment of Ti-based materials, an aqueous mixture of acetic acid and hydrofluoric acid is often used as electrolyte solution 22, so that the ingredients HOAc and/or HF and/or $H_2O$ can be determined. In the case of electrolyte solutions 22 that contain nitric acid and hydrofluoric acid, correspondingly, the ingredients HF and/or $HNO_3$ can be investigated. Apart therefrom, electrolyte solutions 22 that are used for cleaning and/or for standard electroplating processes, such as, e.g., nickel plating, chrome plating, etc., also can be basically investigated by near infrared spectroscopy.

Based on the results of the near infrared spectroscopic investigation, for example, it can be examined by a computing device (not shown) whether the electrolyte solution 22 fulfills a predefined quality criterion. The computing device can be part of the near infrared spectrometer 24 or can be coupled to the latter wirelessly or by cable for data exchange. If the electrolyte solution 22 should not fulfill the quality criterion, optionally, an optic, haptic, and/or acoustic warning signal can be produced via a human-machine interface, which also can be part of the near infrared spectrometer 24 or can be coupled to the latter wirelessly or by cable for data exchange.

If such a quality problem is detected, in an embodiment, the electrolyte solution 22 can be modified until it again fulfills the predefined quality criterion. In this case, the modification can also be controlled and/or regulated by a near infrared spectroscopic investigation of the electrolyte solution 22. Said modification may comprise, for example, a filtering of the electrolyte solution 22 and/or concentration adjustments of specific ingredients.

If a quality problem is not detected, the electrolyte solution 22 can optionally be cycled.

In this way, different component types, such as blisks or blings (made of Ni-based and/or Ti-based alloys), low pressure turbine disks and, in general, all components 12 that are to be processed, shall be machined, etched or cleaned.

The device 10 and/or the described method make possible an online measurement of electrolyte solutions 22 by near infrared spectroscopy (NIR). In this case, a qualitative and/or a quantitative determination of ingredients with asymmetric bonds (—NH, —OH, —SH, —CH) as well as inducible dipole moments can be carried out. This makes possible a real time measurement, an integration of the investigation and the investigation results in one control station, which permits a continuous process regulation, and a rapid reaction in the case problems should occur. The near infrared spectrometer 24 and/or the investigation method can be simply integrated into existing systems and permits/permit an investigation without additional manual expenditure. The investigation method also takes place without the use of chemicals and can produce a measurement result within one minute or less. Also, any possible cases of disruption can be recognized more rapidly therewith.

In the case of (P)ECM, the continuous investigation can be coupled with an automatic control or regulation of the addition of electrolyte, in order to obtain a consistent electrolyte composition. In the case of electroplating methods, a particularly high quality assurance can be realized. Likewise, the stability of process baths will be increased, which leads to lower disposal costs and a better environmental footprint.

The parameter values indicated in the documentation for the definition of process conditions and measurement conditions for characterizing specific features of the subject of the invention are also within the scope of deviations—for example, based on measurement errors, system defects, weighing errors, DIN tolerances and the like—and are to be viewed as encompassed by the scope of the invention.

What is claimed is:

1. A method for investigating an electrolyte solution for processing a component or a component material of an aircraft engine, by near infrared spectroscopy, comprising the steps of:
providing a near infrared spectrometer;
providing an electrolyte solution; the near infrared spectrometer penetrating into the electrolyte solution at least one millimeter and inducing overtone and combination band molecular vibrations;
providing a component material to be machined;
providing a tool proximal to the component;
providing a DC voltage source with an anode and a cathode;
electrically coupling the cathode to the tool;
electrically coupling the anode to the component material;
guiding the electrolyte solution between the tool and the component material;
machining the component material with the tool and electrolyte material therebetween;
downstream electrolyte solution being created downstream of where the step of machining the component material is carried out;
arranging the near infrared spectrometer proximal to the downstream electrolyte solution;
detecting the overtone and combination band molecular vibrations by the near infrared spectrometer; and
determining qualitatively and/or quantitatively at least one ingredient of the downstream electrolyte solution using the near infrared spectrometer to assess quality of the electrolyte solution.

2. The method according to claim 1, wherein the step of determining qualitatively and/or quantitatively is carried out continuously or at predetermined time intervals.

3. The method according to claim 1, wherein at least one quality parameter of the electrolyte solution is determined from the step of determining qualitatively and/or quantitatively.

4. The method according to claim 1, further comprising the steps of:
defining a quality criterion;
after the step of determining qualitatively and/or quantitatively, determining if the downstream electrolyte solution meets the defined quality criterion.

5. The method according to claim 4, wherein the downstream electrolyte solution is further used for processing the component material if it fulfills the predefined quality criterion, or in which the downstream electrolyte solution will not be used for processing the component material if it does not fulfill the predefined quality criterion.

6. The method according to claim 4, wherein the downstream electrolyte solution is modified, purified and/or adjusted, if it does not fulfill the predefined quality criterion, and/or in which a warning signal is generated by a human-machine interface if the electrolyte solution does not fulfill the predefined quality criterion.

7. The method according to claim 6, wherein the downstream electrolyte solution is modified until it fulfills the predefined quality criterion, wherein the modification is controlled and/or regulated based on at least one additional carrying out of the step of determining qualitatively and/or quantitatively.

8. The method according to claim 1, wherein the at least one ingredient includes one or more of water, nitrate, sulfate, fluoride, chloride, and acetic acid.

9. The method according to claim 1, wherein the electrolyte solution is used for electrochemical metal machining ((P) ECM) of the component material and/or for pretreatment of the component material for CBN coating, and/or for pretreatment of Ti-containing component materials, and/or for cleaning the component material, and/or for an electroplating coating method and/or wherein the electrolyte solution is used for processing a component from the group composed of blisk, bling, and low-pressure turbine disk.

10. The method according to claim 1, wherein the step of determining qualitatively and/or quantitatively at least one ingredient of the downstream electrolyte solution using the near infrared spectrometer is carried out by a Fourier transform based (FT-NIR) spectrometer and/or a dispersive spectrometer.

11. The method according to claim 1, wherein a plurality of ingredients of the downstream electrolyte solution, using a single scan of the near infrared spectrometer to assess quality of the electrolyte solution, are determined qualitatively and/or quantitatively.

* * * * *